(12) United States Patent
Hirata et al.

(10) Patent No.: US 7,960,448 B2
(45) Date of Patent: Jun. 14, 2011

(54) METHOD FOR PRODUCING PUNCTURE SEALANT

(75) Inventors: Narukuni Hirata, Kodaira (JP); Ryuji Izumoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 148 days.

(21) Appl. No.: 12/441,067

(22) PCT Filed: Sep. 13, 2007

(86) PCT No.: PCT/JP2007/067794
§ 371 (c)(1),
(2), (4) Date: Mar. 12, 2009

(87) PCT Pub. No.: WO2008/032765
PCT Pub. Date: Mar. 20, 2008

(65) Prior Publication Data
US 2010/0099797 A1   Apr. 22, 2010

(30) Foreign Application Priority Data

Sep. 13, 2006 (JP) .................. 2006-248774

(51) Int. Cl.
*B29C 73/00* (2006.01)
(52) U.S. Cl. ...................................................... 523/166
(58) Field of Classification Search ................... 523/166
See application file for complete search history.

(56) References Cited

U.S. PATENT DOCUMENTS

| 2003/0050365 A1 | 3/2003 | Kishida et al. |
| 2004/0010059 A1 | 1/2004 | Kojima et al. |

FOREIGN PATENT DOCUMENTS

| JP | 2003-193029 | * | 7/2003 |
| JP | 2003-193029 A | | 7/2003 |
| JP | 2003-342551 A | | 12/2003 |

* cited by examiner

*Primary Examiner* — Edward J Cain
(74) *Attorney, Agent, or Firm* — Sughrue Mion, PLLC

(57) ABSTRACT

A method for producing a puncture sealant, including: performing a first mixing to mix an anti-freezing agent and water; performing a second mixing to mix a mixed liquid obtained from the first mixing and a rubber latex; and performing a third mixing to mix a mixed liquid obtained from the second mixing and an adhesive agent.

8 Claims, No Drawings

METHOD FOR PRODUCING PUNCTURE SEALANT

TECHNICAL FIELD

The invention relates to a method for producing a puncture sealant that can be injected into the inside of an air-inflated tire so as to seal a puncture hole made in the air-inflated tire.

BACKGROUND ART

In recent years, a sealing-and-pump-up device, which is used to repair a puncture when it occurs in an air-inflated tire (hereinafter, simply referred to as "tire") by injecting a liquid sealant into the inner side of the tire and elevating the inner pressure of the tire up to a specified pressure without replacing the tire and wheel, has become widely used. Examples of the sealant used in the sealing and pump-up device of this kind include one produced by agitating and mixing a mixture of a rubber latex, a resin emulsion, and an anti-freezing agent consisting of propylene glycol. In general, in the production process of such sealant, the rubber latex and an adhesive agent are mixed so as to prepare a mixed liquid, and then the anti-freezing agent is incorporated into the resultant mixed liquid so as to prepare a stock liquid of sealant. However, propylene glycol rapidly absorbs water from the rubber latex that is present nearby and contacts to the propylene glycol when the propylene glycol is incorporated in the mixed liquid, because propylene glycol used as the anti-freezing agent is an extremely highly miscibile to water. Due to this, the concentration of rubber particles contained in the latex that is present nearby the propylene glycol becomes extremely high to have the rubber particles aggregate and form aggregates, and thus, a phenomenon that a part or whole of the sealant solidifies (gells) by employing the aggregates as cores of the solidification tends to occur.

As a method for producing a sealant which aims preventing the generation of the aggregates, for example, a method described in Patent Document 1 has been known. The method for producing the sealant described in Patent Document 1 includes a step of incorporation and agitation of an anti-freezing agent in which the anti-freezing agent is incorporated in a mixed liquid of a rubber latex and an adhesive agent that is accommodated in a cylindrical vessel and agitate the mixture. In the incorporation and agitation step, the anti-freezing agent is incorporated into the surface of the mixed liquid through plural inlets at a relatively slow rate of 0.01 to 1.0 liter/min per one inlet, while the mixed liquid is agitated with agitation vanes at a relatively fast vane-tip speed of 1.0 to 10.0 m/sec.

According to the method for producing the sealant described in Patent Document 1, propylene glycol is incorporated little by little at a slow rate into the surface of the mixed liquid while the mixed liquid of the rubber latex and adhesive agent is agitated at the speed described above, so that propylene glycol can be prevented from rapidly absorbing water from its surrounding and that the concentration of the latex particles can be prevented from being locally increased. As a result, one may expect to obtain an effect that the latex aggregates that are formed by aggregation of plural latex particles are effectively prevented from being formed in the stock liquid of the sealant.

Further, Patent Document 1 describes that the agitation is preferably continued for a certain length of time (5 minutes or more, for example) after the incorporation of the anti-freezing agent (ethylene glycol) is completed. This is because aggregation and growth of fine latex aggregates that are formed in the stock liquid of sealant during the agitation can be promoted by continuing the agitation for a certain length of time. This enables easier removal by filtration of the latex aggregates from the stock liquid of sealant than if the latex aggregates are left in a fine size in the stock liquid of sealant.

The present inventors found that, when a certain amount or more of the latex aggregates remain in the product sealant because of incomplete removal of the latex aggregates from the stock liquid of sealant, there may occur a phenomenon in which the latex aggregates serve as cores to promote the gelling of the sealant. There is a concern that the ability of the sealant to seal puncture holes could deteriorate over time due to this phenomenon. Further, there is a concern that over a long period of time the whole of the sealant will become gelled and cannot be injected into a tire.

Patent Document 1: Japanese Patent Application Laid-Open No. 2003-342551

DISCLOSURE OF THE INVENTION

Problems to be Solved by the Invention

The present inventors performed experiments to confirm the effects and the like of the method for producing the sealant described in Patent Document 1. Latex aggregates were not sufficiently removed from the stock liquid of the sealant by simply agitating the stock liquid of the sealant continuously over a predetermined length of time. The experiment made it clear that gelation of the sealant produced from the stock liquid of sealant cannot be completely prevented by the method.

In view of the above circumstances, the invention provides a method for producing a puncture sealant that is capable of effectively preventing gelation of sealants caused by aggregates of a rubber latex.

Means for Solving the Problems

Namely, the invention provides a method for producing a puncture sealant, which includes: performing a first mixing to mix an anti-freezing agent and water; performing a second mixing to mix a mixed liquid obtained from the first mixing and a rubber latex; and performing a third mixing to mix a mixed liquid obtained from the second mixing and an adhesive agent.

In the invention, the rubber latex preferably contains at least one selected from the group consisting of a styrene butadiene rubber (SBR) latex, an acrylonitrile butadiene rubber (NBR) latex, a methylmethacrylate butadiene rubber (MBR) latex, a butadiene rubber (BR) latex, a carboxyl modified-NBR latex, and a carboxyl modified SBR latex.

The invention further provides a method for producing a puncture sealant, which includes: performing a first mixing to mix a synthetic rubber latex and an adhesive agent; performing a second mixing to mix an anti-freezing agent and water; and performing a third mixing to mix the mixed liquid obtained in the first mixing and the mixed liquid obtained in the second mixing.

Effect of the Invention

A method for producing a puncture sealant that is capable of effectively preventing gelation of sealants caused by aggregates of a rubber latex can be provided.

BEST MODE FOR CARRYING OUT THE INVENTION

The methods for producing a sealant according to exemplary examples of the invention will be described separately in a first exemplary embodiment and a second exemplary embodiment.

First Exemplary Embodiment

A method for producing a puncture sealant according to the first exemplary embodiment includes: performing a first mixing to mix a synthetic rubber latex and an adhesive agent; performing a second mixing to mix an anti-freezing agent and water; and performing a third mixing to mix the mixed liquid obtained in the first mixing and the mixed liquid obtained in the second mixing. Hereinafter, each process will be described.

(1) First Mixing:

The first mixing is a process to mix an anti-freezing agent and water. The mixing ratio of the anti-freezing agent to water by mass (the ratio of the anti-freezing agent/water) is preferably from 3.0 to 10.0. The mixing is preferably accompanied with agitation, and the speed of the agitation is preferably from 50 to 500 rpm.

The anti-freezing agent preferably contains at least one selected from the group consisting of ethylene glycol, propylene glycol, diethylene glycol, and dipropylene glycol. The content of the anti-freezing agent is preferably from 10 to 60% by mass in the puncture sealant finally obtained. When the content of the anti-freezing agent is less than 10% by mass, anti-freezing effect may not be sufficiently attained at low temperature in some cases. When the content of the anti-freezing agent is higher than 60% by mass, a sufficient sealing performance may not be attained in some cases since the relative amount of the rubber latex becomes small.

(2) Second Mixing:

The second mixing is a process to mix a mixed liquid (mixed liquid (1-1)) obtained in the first mixing and a rubber latex. The mixing ratio of the mixed liquid and the rubber latex by mass (the ratio of the mixed liquid (1-1)/the rubber latex) is preferably from 0.8 to 2.2. The mixing is preferably accompanied with agitation, and the speed of the agitation is preferably from 50 to 500 rpm.

A NR (natural rubber) latex or a synthetic rubber latex can be preferably used as the rubber latex. Considering properties to corrode tires and the like, a synthetic rubber latex can be more preferably used. The synthetic rubber latex preferably contains at least one selected from the group consisting of an SBR latex, an NBR latex, an MBR latex, a BR latex, a carboxyl group modified NBR latex, and a carboxyl modified SBR latex.

(3) Third Mixing:

The third mixing is a process to mix a mixed liquid (mixed liquid (1-2)) obtained in the second mixing and an adhesive agent.

The mixing ratio of the mixed liquid (1-2) to the adhesive agent by mass (the ratio of the mixed liquid (1-2)/the adhesive agent) is preferably from 6.0 to 17.0. The mixing is preferably accompanied with agitation, and the speed of the agitation is preferably from 50 to 500 rpm.

An emulsion of a resin usable as the adhesive agent preferably contains at least one selected from the group consisting of a terpene resin, a rosin resin, a tole oil resin, a phenol resin, a petroleum resin, and a modified compound of any one of these.

The gelation of sealants caused by aggregates of a rubber latex may be effectively prevented by performing mixing in a predetermined combinations as employed in the first to third mixings through stabilizing (against long term storage) the latex, that is the most essential for exhibiting sealing property in a water-based system.

In the invention, the third mixing may be followed by filtrating or aggregate-formation promoting in accordance with necessity. These processes are described respectively below.

Filtrating

The filtrating is a process to filter the mixed liquid obtained by the third mixing in accordance with necessity. As a filtration method, known methods can be used for a method of the filtrating. Depending on conditions, there are cases where gelation caused by a rubber latex aggregation proceeds after the mixings to generate fine particles of aggregates. Further, if the aggregates are left to stand, gelation which employs the aggregates as cores further proceeds in some cases. Therefore, it is preferable to perform the filtrating to remove the fine particles of aggregates that serve as cores to that ultimately the gelation of sealants caused by aggregates of a rubber latex can be effectively prevented. As a result of this process, the storage stability of the resultant puncture sealant can be further improved.

Preferable examples of a filtrating member of a filter used for the filtration may include a mesh filter that is formed into a wire mesh and is made of a metal. The mesh number of the mesh filter is preferably from 50 meshes (with the aperture diameter of the meshes being about 300 μm) to 400 meshes (the aperture diameter of the meshes being about 30 μm). Preferable examples of a material for the mesh filter include a metallic material having high corrosion resistance such as stainless steel or aluminum.

Examples of the material for the filtrating member further include: a porous filter which have a large number of fine open holes with an aperture diameter nearly equal to the size of the mesh of the mesh filter of 50 meshes to 400 meshes; and a multi-layered filter in which a plurality of mesh filters or porous filters are piled up.

(3) Aggregate-Formation Promoting:

Prior to the filtrating, a process to promote formation of aggregates can be preferably included in the method of the invention. In this aggregate-formation promoting, the stock liquid of the sealant prepared in the mixings is stored (left to stand still to age) in a vessel over 24 hours or more, which is preferably 48 hours or more, without being agitated. The lower limit of the time length for the standing still may be appropriately varied within a range of 24 hours to 48 hours in consideration of other production conditions such as the number of meshes of the mesh filter used in the filtrating.

Further, the upper limit of the time length for the standing still is not particularly specified. However, there are limitations with respect to the processing time length (tact time) for producing the puncture sealant, the amount of the produced puncture sealant to be stored, and the like. Further, the amount of water of the sealant may change during storage since the amount of water contained in the puncture sealant gradually changes by evaporation or moisture absorption in accordance with the storing environment. Considering these, the upper limit of the stand still time can be preferably set to be 480 hours or less.

In each process described above, an addition of a dispersant, an emulsifier, a foaming stabilizer, or a pH adjuster such as ammonia or caustic soda may be appropriately performed.

Second Exemplary Embodiment

A method for producing a puncture sealant according to the second exemplary embodiment of the invention includes:

performing a first mixing to mix a synthetic rubber latex and an adhesive agent; performing a second mixing to mix an anti-freezing agent and water; and performing a third mixing to mix the mixed liquid obtained in the first mixing and the mixed liquid obtained in the second mixing. Hereinafter, each process will be described.

(1) First Mixing:

The first mixing is a process to mix a synthetic rubber latex and an adhesive agent. The mixing ratio of the synthetic rubber to the adhesive agent by mass (the ratio of the synthetic rubber latex/the adhesive agent) is preferably from 2.0 to 8.0. The mixing is preferably accompanied with agitation, and the speed of the agitation is preferably from 50 to 500 rpm.

(2) Second Mixing:

The second mixing is a process to mix an anti-freezing agent and water. The mixing ratio of the anti-freezing agent to water by mass (the ratio of the anti-freezing agent/water) is preferably from 3.0 to 10.0. The mixing is preferably accompanied with agitation, and the speed of the agitation is preferably from 50 to 500 rpm.

(3) Third Mixing:

The third mixing is a process to mix a mixed liquid obtained in the first mixing (mixed liquid (2-1)) to the mixed liquid obtained in the second mixing (mixed liquid (2-2)). The mixing ratio of the mixed liquid (2-1) to the mixed liquid (2-2) by mass (the ratio of the mixed liquid (2-1)/the mixed liquid (2-2)) is preferably from 0.5 to 3.0. The mixing is preferably accompanied with agitation, and the speed of the agitation is preferably from 50 to 500 rpm.

The conditions in the second exemplary embodiment are substantially similar to the conditions in the first exemplary embodiment respectively, except for the conditions of mixing orders and mixing ratios of each of the added components. The second exemplary embodiment is further similar to the first exemplary embodiment in that the filtrating and/or the aggregate-formation promoting may be appropriately included therein. The second mixing of the present exemplary embodiment employs a synthetic rubber latex. Therefore, this embodiment may provide a higher storage stability as compared with the case where a deprotein natural rubber latex is used. Therefore, gelation caused by aggregates of rubber latex may be effectively prevented according to this embodiment.

The puncture sealant subjected to the mixings or the filtrating can be charged in a liquid container having a volume corresponding to an amount that is required for repairing puncture once (for example, 200 g to 800 g), then the inlet of the liquid container can be closed with an inner cap (not shown in the figure) and an outer cap, so that the puncture sealant can be kept in the capped liquid container.

The liquid container can be loaded on a sealing-and-pump-up device upon repairing punctures of tires after the inside seal plate and the outside seal plate are removed respectively. The sealing and pump-up device pressurizes the puncture sealant kept in the liquid container with the help of a pump or the like to inject the puncture sealant from the liquid container into the inside of a tire through a joint hose connected to a tire valve of the tire by pressure.

EXAMPLES

The invention will be hereinafter further described in detail with reference to the following examples, while the invention cannot be limited by those examples as long as the spirit of the invention is maintained.

Example 1

45 parts by mass of propylene glycol and 5 parts by mass of water were mixed to prepare a mixed liquid (1-1). 40 parts by mass of SBR latex were dropped to the mixed liquid (1-1) at a dropping flow rate of 0.5 liter/min to prepare a mixed liquid (1-2). Then, 10 parts by mass of a rosin resin were dropped to the mixed liquid (1-2) to produce a puncture sealant.

Example 2

A puncture sealant was prepared in a similar manner to that of Example 1, except that the dropping flow rate of the mixed liquid (1-1) was changed to 15 liter/min.

Example 3

A puncture sealant was prepared in a similar manner to that of Example 1, except that the dropping flow rate of the mixed liquid (1-1) was changed to 30 liter/min.

Example 4

40 parts by mass of SBR latex and 10 parts by mass of a rosin resin were mixed to prepare a mixed liquid (2-1). Separately, 45 parts by mass of propylene glycol and 5 parts by mass of water were mixed to prepare a mixed liquid (2-2). To the mixed liquid (2-1), the mixed liquid (2-2) was dropped at a dropping flow rate of 1 liter/min to produce a puncture sealant.

Comparative Example 1

A puncture sealant was prepared in a similar manner to that of Example 2, except that a deproteinized NR latex was used in place of the SBR latex.

Evaluation

The rate of the gelation of each of the puncture sealants produced in Examples 1 to 4 and Comparative Example 1 was evaluated by measuring the amount of gel formed after the production. The results of the evaluation are shown in the following Table 1. The rate of the gelation was obtained as follows: 10 g of the puncture sealant were filtered with a 200 mesh filter paper; then the dry weight of solid obtained after filtration was measured. In Table 1, "A" represents that the rate of the gelation is less than 0.01%, "B" represents that the rate of gelation is 0.01% or more and less than 0.1%, and "C" represents that the rate of gelation is 0.1% or more.

TABLE 1

| | Formulation and Content (% by mass) | | | | | Dropping | Evaluation result of |
|---|---|---|---|---|---|---|---|
| | Deprotein NR latex | SBR latex | Rosin resin | Water | Propylene glycol | flow rate (liter/min) | Rate of gelation |
| Example 1 | — | 40 | 10 | 5 | 45 | 0.5 | A |
| Example 2 | — | 40 | 10 | 5 | 45 | 15 | A |
| Example 3 | — | 40 | 10 | 5 | 45 | 30 | A |
| Example 4 | — | 40 | 10 | 5 | 45 | 1 | B |

TABLE 1-continued

|  | Formulation and Content (% by mass) | | | | Dropping flow rate (liter/min) | Evaluation result of Rate of gelation |
|---|---|---|---|---|---|---|
|  | Deprotein NR latex | SBR latex | Rosin resin | Water | Propylene glycol | |
| Comparative Example 1 | 40 | — | 10 | 5 | 45 | 1 | C |

Table 1 shows that all of the puncture sealants of Examples exhibit small gelation rates, which indicate that gelation of sealants caused by aggregates of a rubber latex is suppressed in the Examples. In particular, the puncture sealants of Examples 1 to 3 exhibit the smallest rates of gelation, which indicate that these are the most excellent for practical use. According to the production method described in Example 1, an excellent result of less than 0.01% of the gelation rate may be attained over a wide range of the dropping flow rate of 0.5 to 30 liter/min.

INDUSTRIAL APPLICABILITY

According to the invention, a method for producing a puncture sealant which effectively prevents gelation of a sealant caused by aggregates of a rubber latex can be provided.

What is claimed is:

1. A method for producing a puncture sealant, comprising:
performing a first mixing to mix an anti-freezing agent and water;
performing a second mixing to mix a mixed liquid obtained from the first mixing and a rubber latex; and
performing a third mixing to mix a mixed liquid obtained from the second mixing and an adhesive agent.

2. The method for producing a puncture sealant according to claim 1, wherein
the rubber latex comprises at least one selected from the group consisting of an SBR latex, an NBR latex, an MBR latex, a BR latex, a carboxyl modified-NBR latex, and a carboxyl modified SBR latex.

3. The method for producing a puncture sealant according to claim 1, satisfying at least one of the following (1) to (3):
(1) when performing the first mixing, the mixing ratio of the anti-freezing agent to water by mass (anti-freezing agent/water) is from 3.0 to 10.0;
(2) when performing the second mixing, the mixing ratio of the mixed liquid obtained from the first mixing to the rubber latex by mass (mixing liquid obtained from the first mixing/rubber latex) is from 0.8 to 2.2; and
(3) when performing the third mixing, the mixing ratio of the mixed liquid obtained from the second mixing to the adhesive agent by mass (mixed liquid obtained from the second mixing/adhesive agent) is from 6.0 to 17.0.

4. The method for producing a puncture sealant according to claim 1, wherein
the agitation speed employed in mixing of at least one of the first to third mixings is from 50 rpm to 500 rpm.

5. The method for producing a puncture sealant according to claim 1, wherein
the anti-freezing agent comprises at least one selected from the group consisting of ethylene glycol, propylene glycol, diethylene glycol, and dipropylene glycol.

6. The method for producing a puncture sealant according to claim 1, wherein
the adhesive agent comprises an emulsion comprising at least one of a terpene resin, a rosin resin, a tole oil resin, a phenol resin or a petroleum resin, or a modified compound of any one of these.

7. The method for producing a puncture sealant according to claim 1, comprising, after performing the third mixing, at least one of:
filtering a mixed liquid obtained from the third mixing; or
promoting the formation of aggregates, comprising aging the mixed liquid obtained in the third mixing.

8. The method for producing a puncture sealant according to claim 1, satisfying at least one of the following (1) to (3):
(1) when performing the first mixing, the mixing ratio of the anti-freezing agent to water by mass (anti-freezing agent/water) is from 3.0 to 10.0;
(2) when performing the second mixing, the mixing ratio of the mixed liquid obtained from the first mixing to the rubber latex by mass (mixing liquid obtained from the first mixing/rubber latex) is from 0.8 to 2.2; and
(3) when performing the third mixing, the mixing ratio of the mixed liquid obtained from the second mixing to the adhesive agent by mass (mixed liquid obtained from the second mixing/adhesive agent) is from 6.0 to 17.0, and
the rubber latex comprising at least one selected from the group consisting of an SBR latex, an NBR latex, an MBR latex, a BR latex, a carboxyl modified-NBR latex, and a carboxyl modified SBR latex.

* * * * *